United States Patent [19]

Mori et al.

[11] Patent Number: 4,983,994

[45] Date of Patent: Jan. 8, 1991

[54] THERMAL TRANSFER TYPE PRINTING DEVICE

[75] Inventors: Takashi Mori, Tokyo; Eiichi Sasaki, Yokohama, both of Japan

[73] Assignee: Ricoh Company, Ltd., Tokyo, Japan

[21] Appl. No.: 412,797

[22] Filed: Sep. 26, 1989

[30] Foreign Application Priority Data

Sep. 26, 1988 [JP] Japan ........................... 63-124670[U]
Apr. 27, 1989 [JP] Japan ................................. 1-105884

[51] Int. Cl.[5] ......................... G01D 15/10; B41J 2/315
[52] U.S. Cl. ................................. 346/76 PH; 400/120
[58] Field of Search ..................... 346/76 PH; 400/120

[56] References Cited

FOREIGN PATENT DOCUMENTS 0023064 2/1985 Japan .............................. 346/76 PH
0206673 9/1986 Japan .................................. 400/120

*Primary Examiner*—Mark J. Reinhart
*Assistant Examiner*—Huan Tran
*Attorney, Agent, or Firm*—Cooper & Dunham

[57] ABSTRACT

A printing device suitable for printing on a record medium for use in an overhead projector (OHP) prints at a density controlled as a function of the type of an OHP (transmission type of reflection type) in which the record medium will be used, and/or as a function of the distance from the OHP to the screen. The device can use a transfer printing type print head, in which case the density control can be achieved by means of amplitude or pulse width modulation of the electrical signal energizing the print head or by means of controlling the number or short energization pulses to be applied to the print head.

26 Claims, 5 Drawing Sheets

THERMAL TRANSFER TYPE PRINTING DEVICE

BACKGROUND OF THE INVENTION:

1. Field of the Invention

The present invention relates to a thermal transfer type printing device which uses a printing mechanism such as an electrically energized thermal transfer print head and is particularly suitable for printing on a recording medium for use in an overhead projector (OHP). Other printing mechanisms can be used instead, using techniques such as other thermal processes, ink jet printing, electrophotographic printing, etc.

2. Description of the Prior Art

Thermal transfer printing has been used to print on a transparent or semitransparent recording medium for use in a projector such as an OHP (overhead projector). Thermal transfer type printing has been used for this purpose. There are two kinds of OHP's: a reflection type OHP and a transmission type OHP. In the past, OHP sheets have been printed using the same printing equipment for both reflection type and transfer type OHP's. However, when projecting the same OHP sheet on a screen, the screen image from a reflection OHP has higher density than from a transmission type OHP. The fact that the two types of OHP's project the same OHP sheet as a screen image of perceptibly different densities is believed to be a shortcoming of conventional OHP's.

Furthermore, when projecting an OHP image onto a screen, the distance between the OHP and the screen affects the density of the screen image. The change in perceived density with OHP-to-screen distance is even clearer in the case of a full color image.

Thus, when OHP sheets prepared by the same printing process are used in different types of OHP's and/or in OHP's spaced by different distances from the screen or screens, the visual effect can be undesirable due to the differently perceived densities of the screen images.

SUMMARY OF THE INVENTION

It is an object of the present invention to solve the aforementioned shortcomings of the prior art OHP sheets.

It is another object of the present invention to enable an OHP to project an image of a consistent density onto a screen, corresponding to the density of the images of the original manuscript, regardless of the type or usage mode of the OHP.

It is still another object of the present invention to provide a printing device capable of creating an OHP sheet compensated for the type and usage of the OHP in order to allow an image of a suitable density to be projected onto the screen.

It is still another object of the present invention to provide a printing device capable of creating an OHP sheet compensated in accordance with whether a transmission type OHP or a reflection type OHP is employed in order to project an image of a suitable density onto the screen.

It is still another object of the present invention to provide a printing device capable of creating an OHP sheet compensated in accordance with the distance between an OHP and the screen in order to project an image of a suitable density onto the screen.

DESCRIPTION OF THE PREFERRED EMBODIMENTS

Figure 1A:
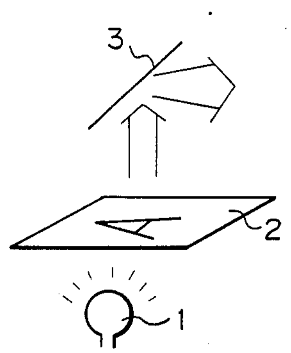
FIGS. 1A (transmission type OHP) and 1B (reflection type OHP) illustrate the reason why the density of an image projected onto a screen depends on the type of an overhead projector (OHP) that is used.

The present invention overcomes the shortcomings of the prior art discussed above through the use of a printing device such as a thermal transfer type printing device which prints images or characters on a recording medium in a manner which takes into account the usage mode of an OHP(Overhead Projector) for projecting the images or characters onto a screen. The density (contrast) of printing can be automatically changed by selecting the usage mode through the use of changeover means. The usage mode of the OHP can be a function of whether a transmission type OHP or a reflection type OHP is employed, and/or of the distance between the OHP and the screen and/or of some other predetermined factors.

A method of creating OHP sheets from an original manuscript by use of a thermal transfer type printer according to the present invention is described hereinafter.

In the case of creating an OHP sheet for use in a transmission type OHP, where the density (contrast) of the image projected onto the screen is low as compared to that of an image projected under otherwise similar conditions by a reflection type OHP, the printing device of the present invention selects a transmission type OHP sheet as the usage mode, and forms an image of a suitably higher density on the surface of the selected OHP sheet.

On the other hand, in the case of creating an OHP sheet for use in a reflection type OHP, where the density (contrast) of the image projected onto the screen is high as compared to that of the same image when projected under otherwise similar conditions by a transmission type OHP, the printer of the present invention selects a reflection type OHP sheet as the usage mode, and prints an image of a suitably lower density on the surface of the selected OHP sheet.

Thus, in accordance with the invention, an image of a suitable, compensated density can be formed on the surface of the selected OHP sheet in both the case of using a transmission type OHP and in the case of using a reflection type OHP.

Furthermore, because the density (contrast) of the image projected onto the screen by an OHP decreases when the distance between the OHP and the screen increases and, conversely, the screen image density increases when the projecting distance decreases, the printing device of the present invention can produce an OHP sheet capable of producing a screen image of increased density when the distance OHP-to-screen is increased, and an OHP sheet capable of producing a screen image of decreased density when the OHP-to-screen distance is decreased.

Thus, images of suitable density can be formed on OHP sheets such that when projected by an OHP, the screen images can be consistent in density regardless of differences in OHP-to-screen distances.

In addition, when in accordance with the present invention the printing device compensates the images printed on the record medium both for the type of an OHP or of OHP's to be used and for the OHP-to-screen distance, the screen images can be consistent in density and can create a pleasing visual effect.

As described heretofore, the printer according to the present invention can automatically print images of suitable densities by selectively changing over the usage mode, such as the type of OHP to be used to project the OHP sheet on a screen (transmission type or reflection type OHP), the distance between the OHP and the screen, etc., or both, to thereby maintain a desired image density and contrast on the screen.

Figure 1B:
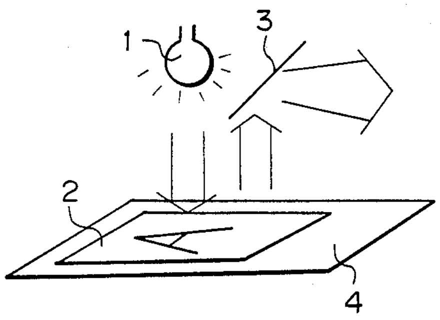
Figure 2:
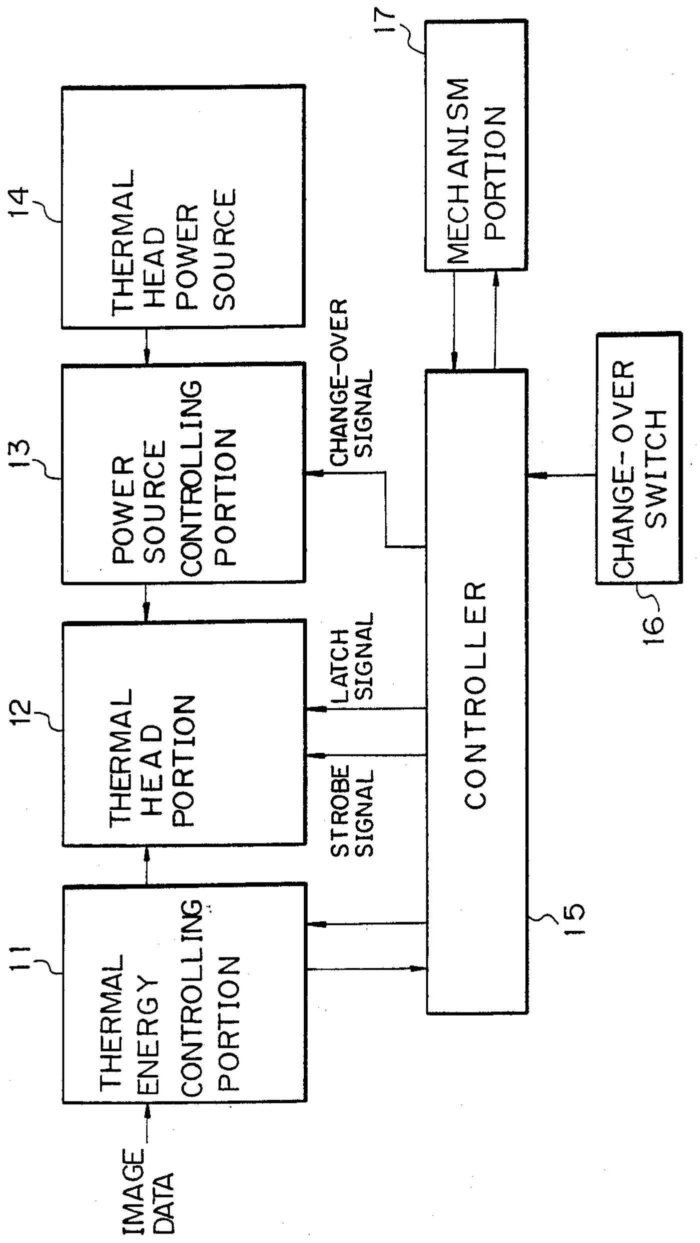
FIG. 2 is a block diagram of a control device according to the present invention.

FIG. 2 illustrates a first exemplary embodiment is illustrated, and FIGS. 1A and 1B illustrates the reason for the difference in density of the projected image as between a transmission type OHP and a reflection type OHP operating under otherwise similar conditions. In a transmission type OHP, as shown in FIG. 1A, light rays emitted from a light source 1 pass through an OHP sheet 2. The light rays are reflected at a mirror 3 and the image on the OHP sheet 2 is thus projected onto a screen (not shown in FIG. 1A). In a reflection type OHP, as shown in FIG. 1B, the light rays emitted from the light source 1 first pass through the OHP sheet 2 to reach a reflection table 4 and are reflected by the reflection table and then pass again through the OHP sheet 2 and only then are reflected at the mirror 3 to thereby project the image on the CHP sheet 2 onto a screen (not shown in FIG. 1B). Thus, in FIG. 1A the light rays pass through the OHP sheet 2 only once but in FIG. 1B they pass through the OHP sheet 2 twice. Consequently, the density of the screen image projected by a reflection type OHP is higher compared with that of the screen image projected by a transmission type OHP. In accordance with the invention, this difference in density can be compensated by changing over the density of the image to be printed on an OHP sheet to a predetermined value depending on the type of an OHP to be used.

A density compensation performed in the environment of a sublimation type thermally operated line printer is described hereinafter as an example.

In FIG. 2, image data are delivered to the printer and a thermal energy controlling portion 11 executes a number of known processing operations applied to the data delivered to the printer, such as to account for the history (past record) of the energization of print head elements, to account for the proximity of energized elements, to apply a gamma-correction, etc. Thereafter, the image data are transmitted to a thermal head portion 12. Electric power is supplied to the thermal head portion 12 from a thermal head power source 14 through a power source controlling portion 13. Signal transmission is performed respectively between the thermal head portion 12 and the power source controlling portion 13 through a controller 15. A control signal is transmitted from the controller 15 to a mechanism portion 17. The density of the image to be printed is changed over to a respective predetermined value for a transmission type OHP sheet or for a reflection type OHP sheet, even when the same original manuscript or image information is employed for creating the OHP sheet. For instance, the density of the image formed on the OHP sheet for use in a transmission type OHP is made suitably higher than that of the image formed on the OHP sheet for use in reflection type OHP such that the apparent densities of the screen images can be the same in both cases.

To this end, a change-over switch 16 selects one of the usage states (e.g., selects a transmission type OHP sheet or a reflection type OHP sheet). A change-over signal generated by the switch 16, e.g, corresponding to the on-off state of the change-over switch, is transmitted to the power source controlling portion 13 through the controller 15. In response, the power source controlling portion 13 changes, for instance, the amplitude of the voltage to be supplied to the thermal head.

Figure 3:
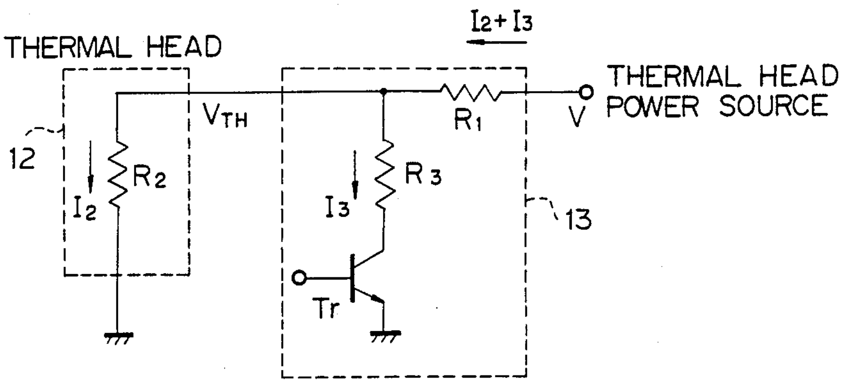
FIG. 3 is a circuit diagram showing an embodiment of a power source controlling portion.

FIG. 3 illustrates an example of a circuit for the power source controlling portion 13. When a change-over signal for selecting a transmission type OHP sheet is transmitted to the printing device, the transistor Tr shown in FIG. 3 is turned off in the power source controlling portion 13. Then, the voltage Vth to be applied to the thermal head portion 12 can be represented by:

$$Vth = V - R1 * I2$$

where I2 is the current through the thermal head element designated R2 in FIG. 3, and the symbol "*" indicates a multiplication operation. When a change-over signal for selecting a reflection type OHP sheet is transmitted to the printing device, the transistor Tr is turned on, and thereby an electric current I3 flows through a resistor R3. Therefore, the voltage Vth2 applied to the thermal head portion 12 can be represented by:

$$Vth2 = V - R1 * (I2 + I3)$$

As a result, the voltage to be applied to the thermal head 12 in the case of creating a transmission type OHP sheet can be made higher than in the case of creating a reflection type OHP sheet. Therefore, the density of the image transferred to the OHP sheet can be high for the transmission type OHP sheet as compared with the density for a reflection type OHP.

In order to change over the density of the printer, the amplitude of the above-mentioned head energizing voltage to be applied is modulated to control the density of the printed image and therefore of the screen image. An alternative to such amplitude modulation can be pulse width modulation, in which the width of a pulse signal to be applied to the thermal head portion can be controlled. For instance, the pulse width can be increased for a transmission type OHP relative sheet to that for a reflection type OHP sheet in order to increase the density of the printed image in a manner allowing consistent screen image density. As another alternative, modulation can be accomplished by changing the number of short pulses to be applied to the thermal head portion 12. For instance, the number of pulses can be increased for a transmission type OHP sheet as compared with that for a reflection type OHP sheet, so that the density of the image printed by the printer can be suitably high for the purpose of obtaining a uniform density of projected images.

Figure 4:
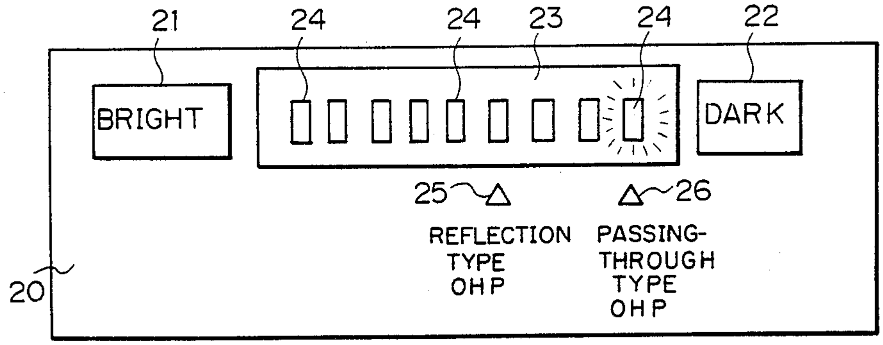
FIG. 4 is a plan view showing a part of a control panel of a variable-density type printer.

To control the density of the image formed by the printer in steps or continuously by the density setting switch, density control portion 20 is mounted on the printer's control panel, as shown in FIG. 4. Further, a low-density button 21 and a high-density button 22 are arranged at the control panel for use as density setting buttons. A density displaying portion 23, for displaying the density which is set at present, can be constructed with a unit comprising an array of a large number of light emitting diodes LED 24. The density of the image formed by the printer can be changed in steps or continuously to a high-density side by pushing the high-density button 22 or to a low-density side by pushing the low-density button 21.

In such a variable-density type printer, the desired density is set to a value suitable for a reflection type OHP sheet or to a transmission type OHP sheet prior to starting the printing process. A mark 25, corresponding to a setting for a reflection type OHP sheet, and another mark 26, corresponding to a setting for a transmission type OHP sheet, are disposed at respective positions at the control panel. If desired, the marks 25 and 26 can be combined with respective switches such that, when the operator pushes those marks (switches), the densities corresponding to the respective OHP sheets can be selected automatically.

Figure 5:
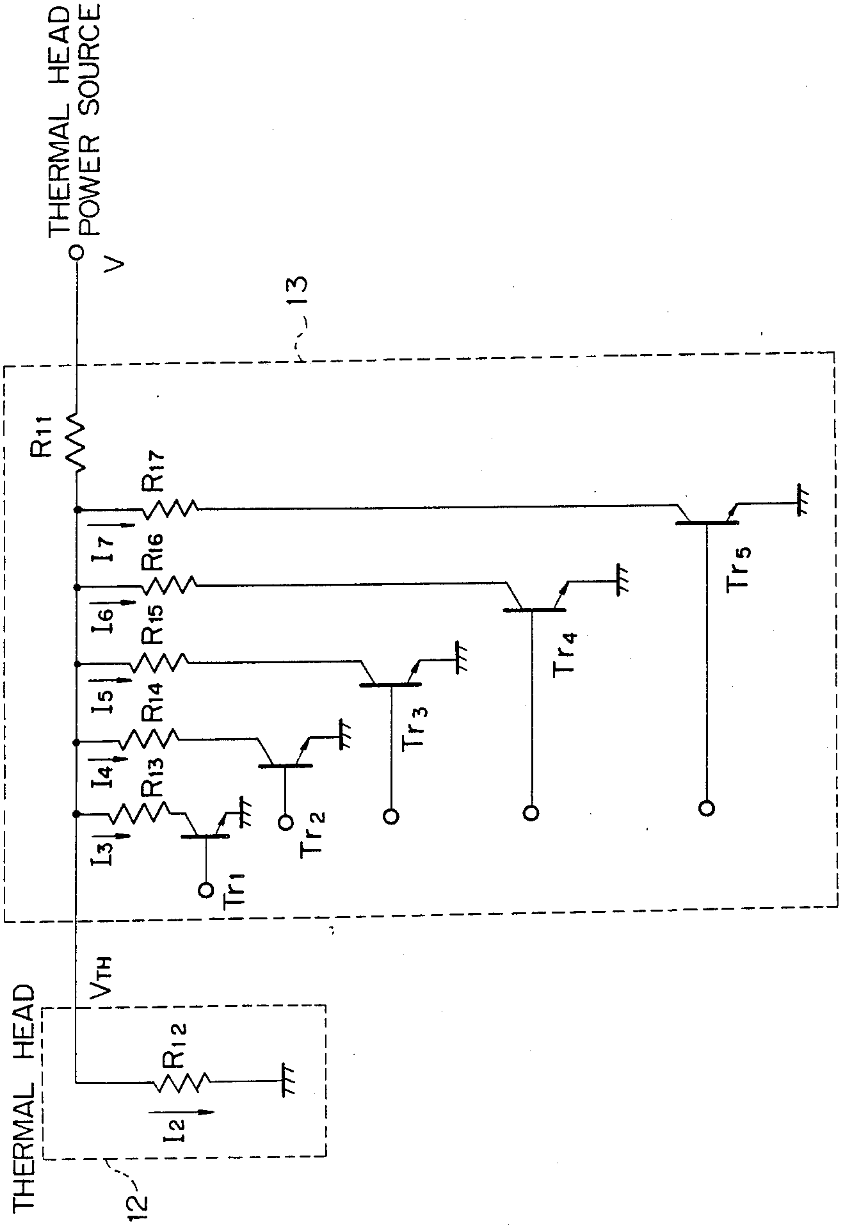
FIG. 5 is a circuit diagram showing an embodiment of a power source controlling portion employed in a variable-density type printer.

FIG. 5 illustrates an exemplary embodiment of a circuit for the power source control portion in a variable-density type printer in accordance with the invention. In FIG. 5, a plurality of transistors Tr (for example, five transistors Tr1 to Tr5) corresponding to respective density steps, can be selectively turned on and off. Changing the number of transistors which are turned on changes the voltage Vth to be applied to the thermal head portion 12 in steps. As an alternative, the voltage Vth can be changed continuously, by changing the resistance value of variable resistors used in place of the transistors Tr1–Tr5.

In FIG. 5, when a change-over signal for selecting a desired print density is transmitted to a designated one of the transistors Tr1–Tr5 in the power source controlling portion 13, the designated transistor is turned on and therefore an electric current flows through the corresponding one of the resistors R13–R17. In consequence, the voltage Vth to be applied to the thermal head portion can be represented by:

$$Vth = V - R11(I2 + C1*I3 + C2*I4 + C3*I5 + C4*I6 + C5*I7)$$

Here, the values of coefficients C1–C5 are "1" or "0" as determined by the change-over signal for selecting the predetermined density. Namely, when a transistor is turned on the value of C is "1", and when a transistor is turned off the value of C is "0". Generally, when employing a plurality of transistors (n transistors), the voltage Vth to be applied to the thermal head portion 12 can be represented by:

$$Vth = V - R11\left[I2 + \sum_{i=1}^{n} C(i)*I(i+2)\right]$$

where "i" is an index.

As an alternative to simply turning the transistors on or off, weights can be imposed on the resistors connected to the collectors of the transistors, applying binary-code signals to the respective bases of the transistors and grounding the emitters. In such a case, the voltage Vth applied to the thermal head portion 12 can be changed in smaller steps. As another alternative, the voltage Vth can be changed over continuously, for instance, by use of variable resistors in place of the illustrated transistors. The resistance of each variable resistor can be controlled by a suitable change-over signal, using known techniques for the purpose.

Figure 6:
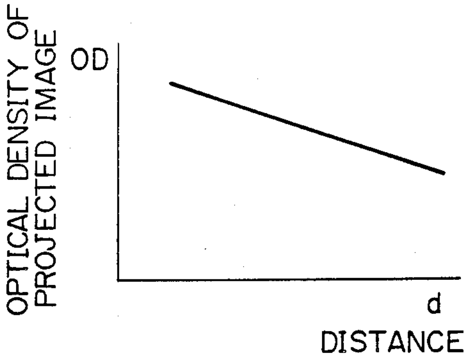
FIG. 6 is a graph showing the relationship between projecting distance and the density of an image projected onto a screen.

FIG. 6 illustrates a second exemplary embodiment, in which the usage mode is a function of the desired distance between the OHP and the screen. As seen in FIG. 6, when the distance d between the OHP and the screen is changed, the optical density (OD) of the image projected onto the screen varies. Specifically, the density of the image projected onto the screen decreases with increased distance between the OHP and the screen. In accordance with the invention, the density of the image printed on the OHP sheet by the printer can be changed over depending on the distance between the OHP and the screen in order to obtain uniform density of the projected image. Thus, when the image densities of the employed OHP sheets themselves are suitably different from each other and the OHP's are arranged at different distances from the screen (or screens), the densities of the screen images can be equalized in accordance with the invention by controlling the densities of the OHP sheets.

Figure 7:
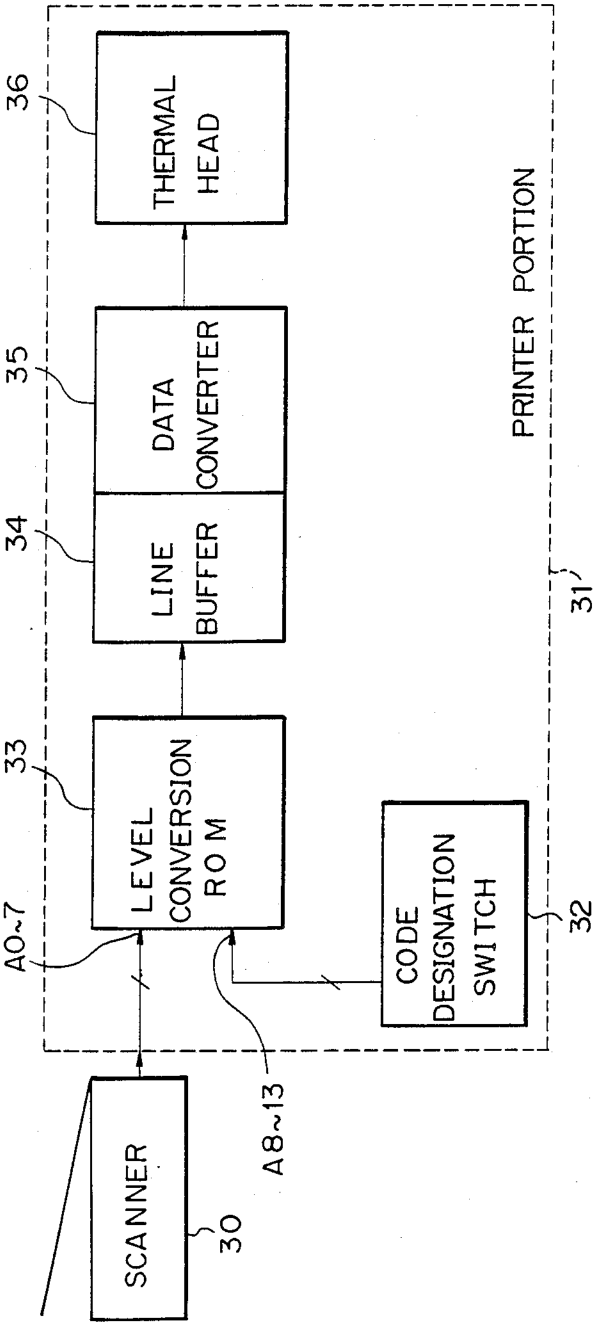
FIG. 7 is a block diagram showing another embodiment of the control device.

In FIG. 7, the reference numeral 30 represents a scanner for reading out the image of the original manuscript, 31 represents a printer portion for printing out the readout image, 32 represents a code-designation switch, 33 represents a level-conversion ROM, 34 represents a line buffer, 35 represents a data converter, and 36 represents a thermal head.

With reference to FIG. 7, the image of the original manuscript is read out by the scanner 30 and the readout image data are transmitted to the printer portion 31. The image data, in binary form, transmitted from the scanner 30 are stored in addresses A0–A7 of the level-conversion ROM 33 as signals representing halftone, and a distance code previously set in the printer portion 31 is selected by the code-designation switch 32. The resulting code-designation signals, for instance, in a hexadecimal form, are stored in addresses A8–A13 of the level-conversion ROM 33.

The image data transmitted from the scanner 30 are converted to signals designating the number of short pulses corresponding to optimum density of the projected image in relation to the projecting distance by the level-conversion ROM 33, and the converted image data signals are output therefrom and drive (energize) the thermal head 36 through the line buffer 34 and the data converter 35. An ink sheet and an OHP sheet (transparent sheet) are brought into pressed contact with each other by use of the thermal head 36 and a platen not shown in FIG. 7, and the signals designating the numbers of short pulses corresponding to the desired image data are applied to the printer. In such a way, the density of the image can be expressed in continuous half tone. 10 An example of the relationship of the projecting distance (the OHP-to-screen distance) as the usage mode and the distance code is shown in TABLE 1.

TABLE 1

| | DISTANCE CODES (BINARY-HEXADECIMAL-DECIMAL) | | | | | | | |
|---|---|---|---|---|---|---|---|---|
| PROJECTING | BINARY CODES | | | | | | HEXADECIMAL | DECIMAL |
| DISTANCES | A13 | A12 | A11 | A10 | A9 | A8 | CODES | NUMBER |
| 0.90 m | 0 | 0 | 0 | 0 | 0 | 0 | 00 H | 0 |
| 0.93 m | 0 | 0 | 0 | 0 | 0 | 1 | 01H | 1 |
| 0.96 m | 0 | 0 | 0 | 0 | 1 | 0 | 02H | 2 |
| 0.99 m | 0 | 0 | 0 | 0 | 1 | 1 | 03H | 3 |
| 1.02 m | 0 | 0 | 0 | 1 | 0 | 0 | 04H | 4 |
| 1.05 m | 0 | 0 | 0 | 1 | 0 | 1 | 05H | 5 |
| 1.08 m | 0 | 0 | 0 | 1 | 1 | 0 | 06H | 6 |
| 1.11 m | 0 | 0 | 0 | 1 | 1 | 1 | 07H | 7 |
| 1.14 m | 0 | 0 | 1 | 0 | 0 | 0 | 08H | 8 |
| 1.17 m | 0 | 0 | 1 | 0 | 0 | 1 | 09H | 9 |
| 1.20 m | 0 | 0 | 1 | 0 | 1 | 0 | 0AH | 10 |
| 1.23 m | 0 | 0 | 1 | 0 | 1 | 1 | 0BH | 11 |
| 1.26 m | 0 | 0 | 1 | 1 | 0 | 0 | 0CH | 12 |
| 1.29 m | 0 | 0 | 1 | 1 | 0 | 1 | 0DH | 13 |
| 1.32 m | 0 | 0 | 1 | 1 | 1 | 0 | 0EH | 14 |
| 1.35 m | 0 | 0 | 1 | 1 | 1 | 1 | 0FH | 15 |
| 1.38 m | 0 | 1 | 0 | 0 | 0 | 0 | 10H | 16 |
| 1.41 m | 0 | 1 | 0 | 0 | 0 | 1 | 11H | 17 |
| 1.44 m | 0 | 1 | 0 | 0 | 1 | 0 | 12H | 18 |
| 1.47 m | 0 | 1 | 0 | 0 | 1 | 1 | 13H | 19 |
| 1.50 m | 0 | 1 | 0 | 1 | 0 | 0 | 14H | 20 |
| 1.53 m | 0 | 1 | 0 | 1 | 0 | 1 | 15H | 21 |
| 1.56 m | 0 | 1 | 0 | 1 | 1 | 0 | 16H | 22 |
| 1.59 m | 0 | 1 | 0 | 1 | 1 | 1 | 17H | 23 |
| 1.62 m | 0 | 1 | 1 | 0 | 0 | 0 | 18H | 24 |
| 1.65 m | 0 | 1 | 1 | 0 | 0 | 1 | 19H | 25 |
| 1.68 m | 0 | 1 | 1 | 0 | 1 | 0 | 1AH | 26 |
| 1.71 m | 0 | 1 | 1 | 0 | 1 | 1 | 1BH | 27 |
| 1.74 m | 0 | 1 | 1 | 1 | 0 | 0 | 1CH | 28 |
| 1.77 m | 0 | 1 | 1 | 1 | 0 | 1 | 1DH | 29 |
| 1.80 m | 0 | 1 | 1 | 1 | 1 | 0 | 1EH | 30 |
| 1.83 m | 0 | 1 | 1 | 1 | 1 | 1 | 1FH | 31 |
| 1.86 m | 1 | 0 | 0 | 0 | 0 | 0 | 20H | 32 |
| 1.89 m | 1 | 0 | 0 | 0 | 0 | 1 | 21H | 33 |
| 1.92 m | 1 | 0 | 0 | 0 | 1 | 0 | 22H | 34 |
| 1.95 m | 1 | 0 | 0 | 0 | 1 | 1 | 23H | 35 |
| 1.98 m | 1 | 0 | 0 | 1 | 0 | 0 | 24H | 36 |
| 2.01 m | 1 | 0 | 0 | 1 | 0 | 1 | 25H | 37 |
| — | — | — | — | — | — | — | — | — |

In TABLE 1, the column "PROJECTING DISTANCES" represents the actual distances between the OHP and the screen which increases in uniform steps, and the column "DISTANCE CODES" represents the codes expressed in hexadecimal numbers corresponding to the actual distances. Binary signals as shown in the TABLE 1 are stored in addresses A9–A13 of the level-conversion ROM 33. In the column "HEXADECIMAL CODE" in the TABLE 1, "H" signifies that the distance codes are hexadecimal, and the symbols A, B, C, D, E and F represent "10", "11", "12", "13", "14" and "15", respectively, and the codes 10H and 20H represent the carried numbers "16" and "32" in the form of decimal number, respectively.

Figure 8:
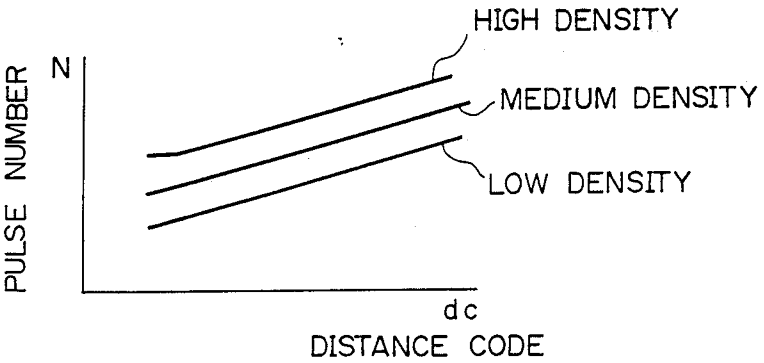
FIG. 8 is a graph showing the relationship between a distance code and the number of driving pulses applied to a printing head.

The image data are stored in the level-conversion ROM in such a way that the numbers of pulses used to drive the thermal head heat elements vary corresponding to the distance codes as shown in FIG. 8. Moreover, the density of the image printed on the OHP sheet is classified into three densities, for instance, high density, medium density and low density. One of those densities is selected previously depending on the desired type of OHP and, further, the density of the image to be printed by the printing device is changed over automatically to the optimum value in accordance with the projecting distance.

Although an embodiment of the printing device which controls density by changing the number of pulses controlling the thermal head in the recording portion according to the present invention has been described heretofore, such control can also be performed by changing the amplitude (p—p value) of the applied signal or the pulse width thereof.

In addition to the above-mentioned embodiment of the thermal process according to the present invention, other processes, such as ink jet process, etc., can be used to carry out at least some of the purposes of the present invention.

In a third exemplary embodiment of the invention, the printer is controlled in accordance with both usage modes discussed above, namely, the type of the employed OHP and the projecting distance at the same time. This third embodiment can be constructed by combining the exemplary embodiments of FIG. 2 and FIG. 7.

According to the present invention, in the case of creating OHP sheets by use of a printing device such as a thermal transfer type printer, (or other suitable printers), the density of the printed image can be changed over to be suitable for a transmission type OHP sheet or to be suitable for a reflection type OHP sheet, to correspond to the projection distance, or both to correspond to the type of an OHP and to the projection distance, by use of the changing-over means. Thus, the densities of the images projected onto the screen by use of different types of OHP's, or by OHP's spaced from the screen or screens by different distances, can be equalized in accordance with the invention.

What is claimed is:

1. A thermal transfer type printing device for printing on a recording medium selectively suitable for use in transmission type overhead projectors and in reflection type overhead projectors, comprising:

thermal print head means for printing an image on a recording medium;

first change-over means for selecting between use of a recording medium in a transmission type overhead projector and use of the recording medium in a reflection type overhead projector and for generating a first change-over signal related to the selected use of the recording medium;

control means coupled to said thermal print head means and responsive to said first change-over signal for controlling the print head to cause the print head to print an image on said recording medium at an image density related to said selected use of the recording medium.

2. A printing device as in claim 1 in which said control means comprises means for causing the image density of an image printed by said print head on a recording medium for a transmission type overhead projector to be higher than the image density of an image printed by said print head on a recording medium for a reflection type overhead projector by an amount sufficient to equalize the image density at a screen on which both images are projected under otherwise similar conditions.

3. A printing device as in claim 2 including a second change-over means for selecting a projection distance and for generating a second change-over signal related to the selected distance, wherein said control means includes means responsive to said second change-over signal for controlling the print head to cause the print head to print an image on said recording medium at an image density related to both of said first and second change-over signals.

4. A printing device as in claim 3 in which said print head is an electrically energized print head, and including a source of an electrical signal for energizing said head, wherein said control means comprises means for controlling the amplitude of said electrical signal as a function of said first and second change-over signals.

5. A printing device as in claim 3 in which said print head is an electrically energized print head, and including a source of an electrical signal for energizing said head, wherein said control means comprises means for pulse width modulating said electrical signal as a function of said first and second change-over signals.

6. A printing device as in claim 3 in which said print head is an electrically energized print head, and including a source of pulses for energizing said head, wherein said control means comprises means for determining the number of pulses to be applied to said print head as a function of said first and second change-over signals.

7. A printing device as in claim 3 in which said first and second change-over means comprise means which generate change-over signals which vary in steps.

8. A printing device as in claim 3 in which said first and second change-over means comprise means which generate change-over signals which vary continuously.

9. A printing device as in claim 1 in which said print head is an electrically energized print head, and including a source of an electrical signal for energizing said head, wherein said control means comprises means for controlling the amplitude of said electrical signal as a function of said first change-over signal.

10. A printing device as in claim 1 in which said print head is an electrically energized print head, and including a source of an electrical signal for energizing said head, wherein said control means comprises means for pulse width modulating said electrical signal as a function of said first change-over signal.

11. A printing device as in claim 1 in which said print head is an electrically energized print head, and including a source of pulses for energizing said head, wherein said control means comprises means for determining the number of pulses to be applied to said print head as a function of said first change-over signal.

12. A printing device as in claim 1 in which said first change-over means comprise means which generate a change-over signal varying in steps.

13. A printing device as in claim 1 in which said first change-over means comprise means which generate a change-over signal varying continuously.

14. A thermal transfer type printing device for printing on a recording medium for use in a selected one of different modes of using an overhead projector comprising:

thermal print head means for printing an image on a recording medium;

change-over means for selecting a mode of using an overhead projectors and for generating a change-over signal related to the selected mode;

control means coupled to said thermal print head means and responsive to said change-over signal for controlling the print head to cause the print head to print an image on said recording medium at an image density related to said selected mode.

15. A printing device as in claim 14 in which said change-over means comprise means for selecting a mode on the basis of whether said recording medium is for use in a transmission type overhead projector or in a reflection type overhead projector.

16. A printing device as in claim 15 in which said change-over means further comprise means for selecting a mode on the basis of projecting distance.

17. A printing device as in claim 14 in which said change-over means comprise means for selecting a mode on the basis of projecting distance.

18. A printing device as in claim 14 in which said print head is an electrically energized print head, and including a source of an electrical signal for energizing said head, wherein said control means comprise means for amplitude modulating said electrical signal as a function of said change-over signal.

19. A printing device as in claim 14 in which said print head is an electrically energized print head, and including a source of an electrical signal for energizing said head, wherein said control means comprise means for pulse width modulating said electrical signal as a function of said change-over signal.

20. A printing device as in claim 14 in which said print head is an electrically energized print head, and including a source of a train of electrical pulses for energizing said head, wherein said control means comprise means for pulse width modulating said electrical signal by selecting the number of pulses to be applied to said print head as a function of said change-over signal.

21. A printing device as in claim 14 including a scanner for reading an original image and for generating data representative of the original image.

22. A printing device for printing images on a recording medium comprising:

a scanner for reading an original image from an original document and for generating image data representative of said original image; and a printer coupled to said scanner to receive said image data therefrom and comprising converting means for converting said image data to print data, printing means for printing an image related to said print data on a recording medium, code designation means for designating a usage code related to a mode of using said record medium, and means responsive to said usage code for controlling said converting means as a function of said usage code to control the density of an image printed on said recording medium by said printing means.

23. A printing device as in claim 22 in which said usage code comprises a distance code related to a selected projecting distance between an overhead projector and a projection screen.

24. A printing device as in claim 23 in which said usage code further comprises a type code designating one of a transmission type overhead projector and a reflection type overhead projector.

25. A printing device as in claim 22 in which said usage code comprises a type code designating one of a transmission type overhead projector and a reflection type overhead projector.

26. A printing device as in claim 22 in which said printer comprises a level-conversion ROM for storing and modifying said image data as a function of said usage code and for providing modified image data, a line buffer for temporarily storing said modified image data, a data converter for converting said modified image data into print data, and a thermal print head responsive to said print data for printing on said recording medium.

* * * * *